Figure 1:
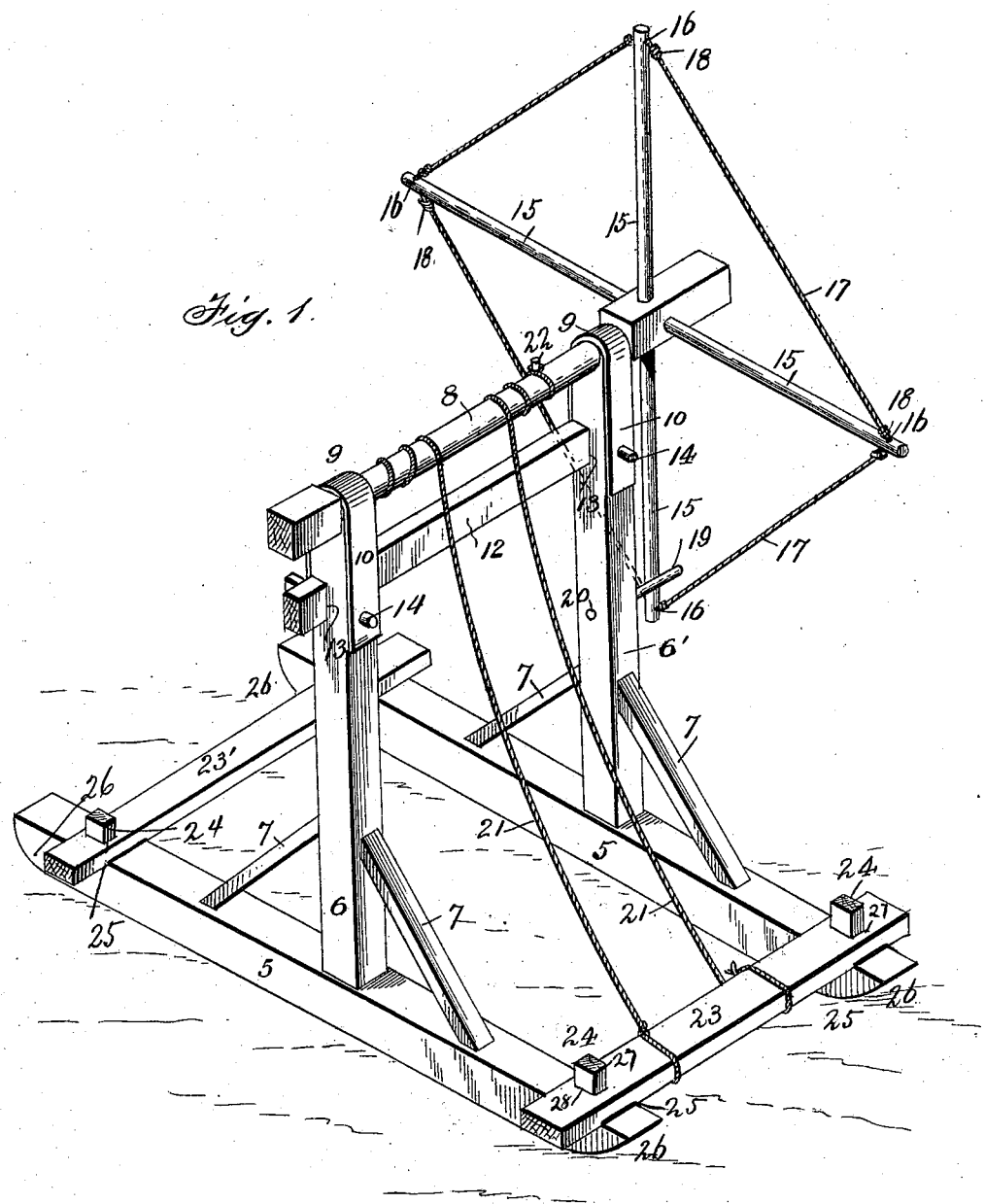

(No Model.) 2 Sheets—Sheet 1.

C. D. LEE.
PORTABLE WINDLASS.

No. 574,917. Patented Jan. 12, 1897.

Witnesses.
F. L. Ouyand.
A. B. Smith.

Inventor.
Charles D. Lee.
By H. B. Willson.
Attorney.

(No Model.) 2 Sheets—Sheet 2.
C. D. LEE.
PORTABLE WINDLASS.
No. 574,917. Patented Jan. 12, 1897.
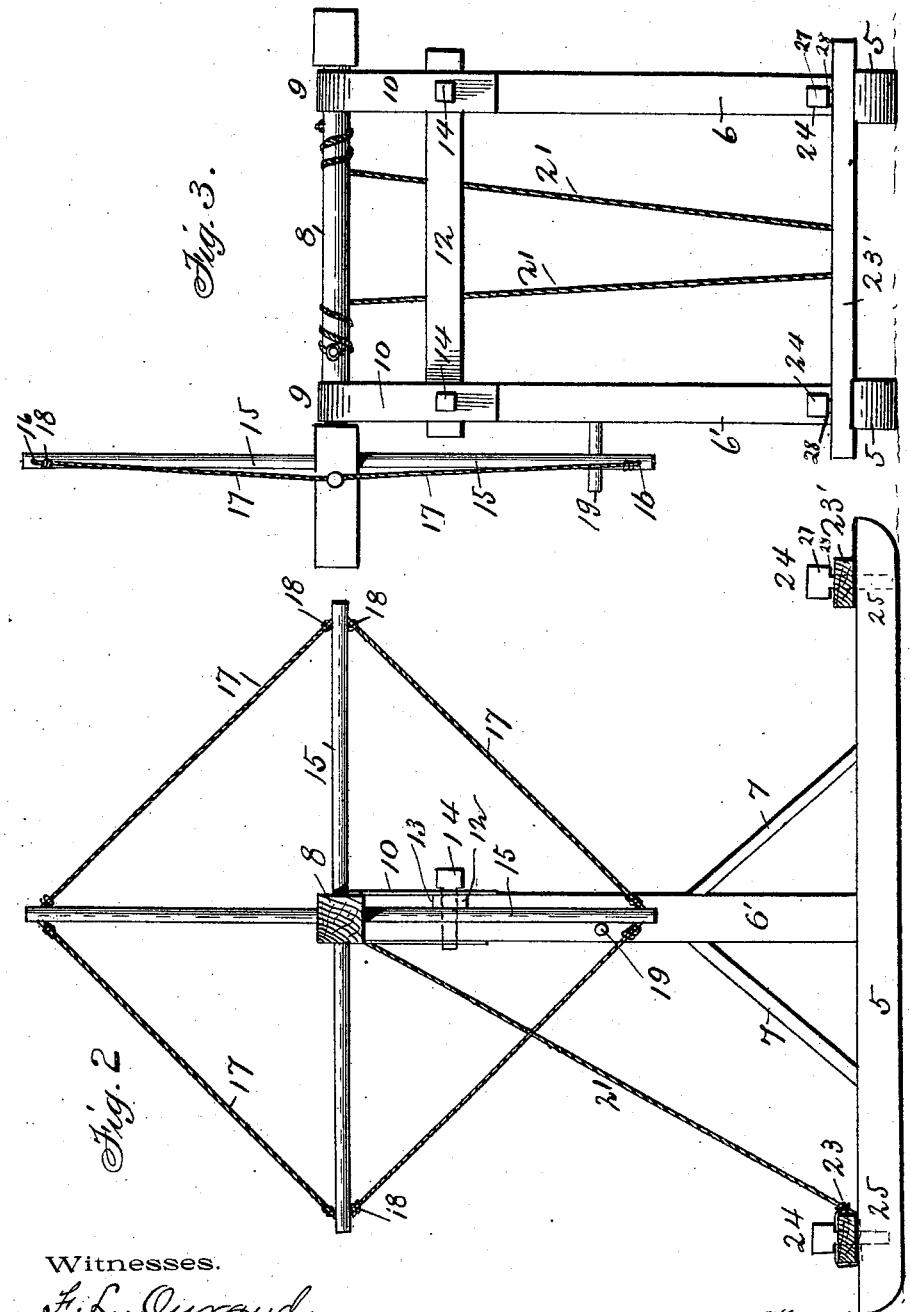
Witnesses.
F. L. Ouraud
J. B. Smit
Inventor.
Charles D. Lee.
By H. Buvilman
Attorney.

UNITED STATES PATENT OFFICE.

CHARLES D. LEE, OF SALMON CITY, IDAHO.

PORTABLE WINDLASS.

SPECIFICATION forming part of Letters Patent No. 574,917, dated January 12, 1897.

Application filed April 28, 1896. Serial No. 589,420. (No model.)

*To all whom it may concern:*

Be it known that I, CHARLES D. LEE, a citizen of the United States, residing at Salmon City, in the county of Lemhi and State of Idaho, have invented certain new and useful Improvements in Portable Windlasses; and I do declare the following to be a full, clear, and exact description of the invention, such as will enable others skilled in the art to which it appertains to make and use the same.

My invention has relation to portable windlasses for farm and ranch use; and the object is to provide a simple, cheap, and convenient device of this kind for handling slaughtered animals and raising and moving heavy weights, &c., from place to place; and to these ends the novelty consists in the construction, combination, and arrangement of the several parts of the same, as will be hereinafter more fully described, and particularly pointed out in the claim.

In the accompanying drawings the same reference-numerals indicate like parts of the invention.

Figure 1 is a perspective view of my improved slaughtering-windlass in operation. Fig. 2 is a side elevation of the same, and Fig. 3 is an end view thereof.

The base-rails 5 5 are provided with uprights 6 6', mortised therein and having the inclined braces 7 7 to give the uprights the necessary stability.

8 is the windlass-shaft, and is journaled in the semicircular bearings 9 in the upper ends of the uprights. This shaft 8 is secured in said bearings, so as to rotate freely, by means of a strap 10, which extends downwardly on each side of the upright, and one end passes down on the outside of the end of the cross-brace 12, which fits in a recess 13 in said upright, and a taper pin or bolt 14 passes through the strap, cross-brace, upright, and the other end of the strap, so as to secure the whole firmly in place.

The out end of the shaft 8 is formed, preferably, square, and it is provided with a series of radial arms or levers 15, the outer ends of which are provided with holes 16, through which passes a hand-rope 17, having knots 18 on each side of the holes 16, and by means of this rope 17 and the radial arms 15 the windlass-shaft can be rotated in either direction.

A pin 19 is removably secured in a hole 20 in the upright 6', so as to lock the windlass in any desired position.

21 21 are flexible ropes or chains, one end of which is secured to a bolt 22 on the shaft 8, and the other end to a cross-brace 23, removably secured by pins 24 in rabbeted recesses 25 in the base-rails 5 5, so that the carcass of an animal or other weight which may be attached to the ropes 21 21 at a point about midway between the shaft 8 and the cross-brace 23, when raised from the ground, will swing entirely clear of the framework, and in the case of an animal the butcher has access to all sides of it. By attaching the lower ends of the ropes to the brace 23 the weight, when suspended, is prevented from swaying or oscillating, as would be the case if the ends of the rope were free. The base-rails 5 5 are provided with beveled ends 26, which permit the windlass and its suspended weight being easily hauled from place to place on the farm or ranch. A second brace 23' is similarly secured by pins 24 in rabbeted recess 25 in the opposite ends of the rails 5 5, and these braces 12 23 23' are amply sufficient to make the windlass firm and secure in operation.

When an animal has been knocked down or killed and it is necessary to hoist it up, or when it becomes necessary to elevate a weight, either of the lower cross-braces 23 or 23' may be temporarily removed and the windlass hauled over the animal or weight, with the rails on each side thereof. The brace is then replaced and the windlass-shaft operated by rope or radial arms to elevate the object, as above described. A sufficient number of the radial arms, say six or eight, may be employed to give the rope 17 a practically circular form for greater convenience in operating or rotating the windlass-shaft. When it is desired to pack the windlass into a smaller compass for storage or transportation to distant points, the pins 14 and 24 may be withdrawn and the shaft, straps, and braces removed. The rope and radial arms are then removed from the windlass-shaft and the whole packed in a comparatively small space. The taper-pins 14 and 24 are provided with enlarged heads 27, which form shoulders 28, and coming in contact with the braces serve to secure the same firmly, and the strength of the body of the pin in cross-section is such as to take up the tendency to lateral or side twist or strain on the uprights, and thereby preserve the whole in an upright rigid position.

Having thus described my invention, what I claim, and desire to secure by Letters Patent, is—

The portable windlass, comprising the base-rails 5, 5, having the recesses 25, in its beveled ends, in which are secured the cross-braces 23, 23', by pins 24, having shoulders 28, and the uprights 6, 6, provided with the rectangular recesses 13 and cross-brace 12 secured therein by pins 14, and having the semicircular bearings 9, in which is journaled a shaft 8, having the straps 10 secured by said pins 14, said shaft 8 being provided with flexible ropes or chains 21, extending to the brace 23, and having its outer end provided with radial arms 15, having holes 16, through which passes a hand-rope 17, having knots 18, on each side of the holes 16, and the locking-pin 19 removably secured in a hole 20 in the uprights 6', substantially as and for the purpose specified.

In testimony whereof I hereunto affix my signature in presence of two witnesses.

CHARLES D. LEE.

Witnesses:
TIMOTHY DORE,
J. P. CLOUGH.